United States Patent
Fischer (10) Patent No.: US 9,435,295 B2
(45) Date of Patent: Sep. 6, 2016

(54) METHOD FOR OPERATING A VOLUME-CONTROLLED INTERNAL-COMBUSTION ENGINE, AND AN INTERNAL-COMBUSTION ENGINE

(71) Applicant: Bayerische Motoren Werke Aktiengesellschaft, Munich (DE)

(72) Inventor: Hubert Fischer, Mammendorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 430 days.

(21) Appl. No.: 14/011,943

(22) Filed: Aug. 28, 2013

(65) Prior Publication Data

US 2013/0340730 A1 Dec. 26, 2013

Related U.S. Application Data

(63) Continuation of application No. PCT/EP2012/000890, filed on Mar. 1, 2012.

(30) Foreign Application Priority Data

Mar. 30, 2011 (DE) .................. 10 2011 006 388

(51) Int. Cl.
*F02M 25/07* (2006.01)
*F02B 29/04* (2006.01)
(Continued)

(52) U.S. Cl.
CPC ............ *F02M 25/0715* (2013.01); *F01N 5/02* (2013.01); *F02B 29/0406* (2013.01);
(Continued)

(58) Field of Classification Search
CPC ...... F01N 5/02; F02B 29/0406; F02B 33/44; F02B 41/00; F02B 41/04; F02D 2009/0283; F02D 9/02; F02M 25/0715; F02M 31/083; F02M 35/10255; Y02T 10/126; Y02T 10/14; Y02T 10/146; Y02T 10/16

USPC ........ 123/540–542, 543, 545, 552, 554–556, 123/559.1–565, 568.11; 417/364; 60/320–321, 327, 397, 614–616, 60/620–624, 39.15–39.17, 39.181, 39.183
See application file for complete search history.

(56) References Cited

U.S. PATENT DOCUMENTS

| | | | |
|---|---|---|---|
| 3,180,079 A * | 4/1965 | Freeman, Jr. | ............. F02D 9/02 123/559.1 |
| 4,508,089 A * | 4/1985 | Baumgartner | ........ F01C 11/008 123/559.1 |

(Continued)

FOREIGN PATENT DOCUMENTS

| | | |
|---|---|---|
| DE | 31 24 668 A1 | 1/1983 |
| DE | 33 13 679 A1 | 10/1984 |

(Continued)

OTHER PUBLICATIONS

Corresponding International Search Report with English Translation dated Apr. 26, 2012 (seven (7) pages).

(Continued)

*Primary Examiner* — Erick Solis
*Assistant Examiner* — Carl Staubach
(74) *Attorney, Agent, or Firm* — Crowell & Moring LLP (57) ABSTRACT

A method is provided for operating a volume-controlled internal-combustion engine having an intake tract and an exhaust system. An expansion machine is arranged in the intake tract in the flow direction of a combustion air in front of an inlet valve of the engine. An output shaft of the expansion machine is coupleable with an output shaft of the engine. A heat exchanger is arranged in the exhaust system. Before combustion air flows through the expansion machine, it is heated in the heat exchanger by exhaust gas of the internal-combustion engine. The method achieves an efficiency improvement in an internal-combustion engine with a volume-controlled load control at partial load.

2 Claims, 5 Drawing Sheets

(51) Int. Cl.
*F02B 41/00* (2006.01)
*F02D 9/02* (2006.01)
*F02M 31/083* (2006.01)
*F02M 35/10* (2006.01)
*F01N 5/02* (2006.01)
*F02B 33/44* (2006.01)

(52) U.S. Cl.
CPC .............. *F02B 33/44* (2013.01); *F02B 41/00* (2013.01); *F02D 9/02* (2013.01); *F02M 31/083* (2013.01); *F02M 35/10255* (2013.01); *F02D 2009/0283* (2013.01); *Y02T 10/126* (2013.01); *Y02T 10/14* (2013.01); *Y02T 10/146* (2013.01); *Y02T 10/16* (2013.01)

(56) References Cited

U.S. PATENT DOCUMENTS

| | | | | |
|---|---|---|---|---|
| 4,667,646 A * | 5/1987 | Shaw | ................ | F02B 41/00 123/559.1 |
| 4,757,686 A * | 7/1988 | Kawamura | ............. | F02B 37/10 290/40 C |
| 4,802,457 A * | 2/1989 | Oscarsson | ................ | F02D 9/02 123/559.1 |
| 5,394,848 A * | 3/1995 | Tsutsumi | ................ | F02D 9/02 123/361 |
| 6,318,310 B1 * | 11/2001 | Clarke | .................... | F02B 33/22 123/70 R |
| 6,425,743 B1 * | 7/2002 | Fischer | ................. | F02C 1/00 415/174.2 |
| 7,540,279 B2 * | 6/2009 | Winsor | .................. | F02B 33/38 123/559.1 |
| 2009/0314005 A1 * | 12/2009 | Messmer | ............... | F02F 1/4292 60/792 |
| 2015/0027116 A1 * | 1/2015 | Fischer | .................. | F02B 29/04 60/605.1 |

FOREIGN PATENT DOCUMENTS

| | | | |
|---|---|---|---|
| DE | 38 19 646 A1 | 12/1988 | |
| DE | 101 16 264 A1 | 10/2002 | |
| JP | WO 2010128558 A1 * | 11/2010 | .............. F02B 41/06 |
| WO | WO 94/24426 A1 | 10/1994 | |

OTHER PUBLICATIONS

German-language Written Opinion dated Apr. 26, 2012 (PCT/ISA/237) (six (6) pages).
"Turbo and Compressor Engines", Development and Technology, Publishers Motorbuchverlag, Hack/Landkabel, 2$^{nd}$ Edition, 2001, ISBN No. 3-613-01950-7, pp. 68-73.

\* cited by examiner

METHOD FOR OPERATING A VOLUME-CONTROLLED INTERNAL-COMBUSTION ENGINE, AND AN INTERNAL-COMBUSTION ENGINE

CROSS REFERENCE TO RELATED APPLICATIONS

This application is a continuation of PCT International Application No. PCT/EP2012/000890, filed Mar. 1, 2012, which claims priority under 35 U.S.C. §119 from German Patent Application No. DE 10 2011 006 388.9, filed Mar. 30, 2011, the entire disclosures of which are expressly incorporated by reference herein.

BACKGROUND AND SUMMARY OF THE INVENTION

The invention relates to a method for operating a volume-controlled internal-combustion engine having an intake tract and an exhaust system, wherein an expansion machine is arranged in the intake tract in a flow direction of combustion air in front of an inlet valve of the internal-combustion engine, as well as to an associated internal-combustion engine.

From German published patent application DE 101 16 264 A1, a method is known for the operation of an internal-combustion engine with mechanical supercharging and variable compression. In the case of the method for the operation of the internal-combustion engine having a mechanical compressor arranged in the intake tract, which mechanical compressor can be driven by way of a coupling device by the crankshaft, combustion air is supplied into an engine intake. Furthermore, a device for the variable adjustment of the compression ratio in the combustion chamber is provided, by way of which a higher compression ratio can be adjusted in the partial-load range of the internal-combustion engine, and a lower compression ratio can be adjusted in the full-load range. The air mass flow to be delivered by the compressor can be adjusted in a variable manner, in which case, in the partial-load range below a reference load value, the compressor is operated in a throttle or expander operation for adjusting a vacuum in the air intake.

Furthermore, the above-mentioned throttle method for internal-combustion engines is known from the book "Turbo- und Kompressormotoren", *Entwicklung und Technik* ("Turbo and Compressor Engines", *Development and Technology*), Publishers Motorbuchverlag, Hack/Landkabel, 2nd Edition 2001, ISBN No. 3-613-01950-7. This known throttle method is explained in detail in this book, Chapter "Ladertypen im Detail" ("Details about Types of Superchargers"), Page 72, Subchapter "Regelung" ("Control").

The above-mentioned method has the disadvantage of a not yet sufficient efficiency increase of the volume-controlled internal-combustion engine, which is still clearly below that of a quality-controlled internal-combustion engine, in which the load control takes place, for example, by means of a lean-burning method ($\lambda > 1$).

It is an object of the present invention to provide a method of operating a volume-controlled internal-combustion engine whereby the efficiency is significantly improved.

With respect to the method, this and other objects are achieved by operating a volume-controlled internal-combustion engine, having an intake tract and an exhaust system, wherein an expansion machine is arranged in the intake tract in a flow direction of combustion air in front of an inlet valve of the internal-combustion engine. An output shaft of the expansion machine is able to be coupled with an output shaft of the internal-combustion engine or with a drive shaft of an electric machine. A heat exchanger that can be arranged in the exhaust system is provided. Before combustion air flows through the expansion machine, it is heated in the heat exchanger by an exhaust gas of the internal-combustion engine. This object is further achieved by a corresponding internal-combustion engine.

It will be demonstrated in the following that, by utilizing the expansion process in the intake tract, not only the charge cycle losses are avoided but, in connection with the exhaust gas heat exchanger according to the invention, clear efficiency advantages and thus significant consumption advantages are achieved. Furthermore, this technology can particularly easily be combined with exhaust gas turbocharging. In the following, an efficient load control (ELS) of a volume-controlled internal-combustion engine will also be mentioned with respect to the invention.

Similar to the increase of internal-combustion engine power that can be achieved by a (mechanically or electrically driven) compressor in the intake tract by compressing the combustion air, by means of an expansion machine instead of the throttle valve, the combustion air can be "diluted", i.e. can be adjusted to a lower density and thereby the power of the internal-combustion engine can be reduced. As a result, the throttle losses of a throttle valve are practically entirely avoided. The efficiency advantage is comparable to a variable valve timing, as used, for example, by BMW in mass production under the "Valvetronic" trademark. In that case, the work carried out in the expansion machine can be fed by way of a mechanical coupling (for example, a belt drive) to the internal-combustion engine. So far, this corresponds to the known state of the art.

A further clear rise of efficiency in the partial load of the internal-combustion engine can be achieved in that, according to the invention, thermal energy is transferred to the combustion air by way of a heat exchanger at the exhaust gas system. The volume flow of the combustion air is thereby increased and, proportionally thereto, also the work that is carried out in the expansion machine in the intake tract. On the output side of the expansion machine, the combustion air is cooled again to the normal combustion air temperature by a cooler, such as a charge air cooler, before it is fed to the internal-combustion engine. Efficiencies can thereby be achieved in the partial-load range of a volume-controlled internal-combustion engine, which are clearly above that of a variable inlet valve drive.

Furthermore, the method can be combined excellently with exhaust gas turbocharging (in this case, a charge air cooler is advantageously already present). A portion of the thermal energy in the exhaust gas can be supplied in the form of a pressure increase to the combustion air of the expansion machine while simultaneously reducing the temperature in the heat exchanger. This advantageously results in a lower temperature load on the components in the intake tract. The efficiency-improving operation of the expansion machine can thereby be expanded by a higher pressure difference by way of the expansion machine into higher load ranges of the internal-combustion engine. The theoretical efficiency that can be achieved in a comparison process corresponds to that of a process implementation with a complete expansion and is therefore even above that of a quality-controlled load control.

In a further development according to the invention, the expansion machine can be coupled to an electric machine or a generator instead of to an internal-combustion engine, and the generated electric current can be fed to an electric storage device or directly to an electric consuming device.

In the case of a corresponding design, i.e. in order to operate the machine used for the load control in a variable manner as an expansion machine as well as a compressor or compression machine, the response behavior of the exhaust turbocharger can additionally be improved, and thereby an internal-combustion engine concept can be implemented that combines high power with a very favorable fuel consumption and, when an exhaust gas turbocharger is used, a very good response behavior (avoidance of a "turbo lag").

Summarizing, the method according to the invention and the internal-combustion engine further developed according to the invention have the following advantages:

(a) very favorable fuel consumption with a high power potential and a very good response behavior when exhaust gas turbocharging;

(b) no high-expenditure internal internal-combustion engine techniques (such a variable valve timing) or burning methods (such as lean-burning methods with a correspondingly high-expenditure exhaust gas after treatment, HCCI, etc.) are required;

(c) the system (method and device) according to the invention can be represented without changing the internal-combustion engine concept (for example, on a TGDI internal-combustion engine (turbo gasoline direct injection)) by way of exclusively external measures (change-over flap, exhaust gas—combustion air—heat exchanger, expansion machine, charge air cooler);

(d) the burning method according to the invention is a conventional λ=1 burning method without any high-expenditure exhaust gas after treatment, and worldwide use of the invention will therefore be possible without any problems; and (e) compared with the benefit, there are only minimal constructional expenditures and a very low technical risk.

Other objects, advantages and novel features of the present invention will become apparent from the following detailed description of two preferred embodiments when considered in conjunction with the accompanying drawings.

DETAILED DESCRIPTION OF THE DRAWINGS

In the following, the same components have identical reference numbers in all figures.

Figure 1:
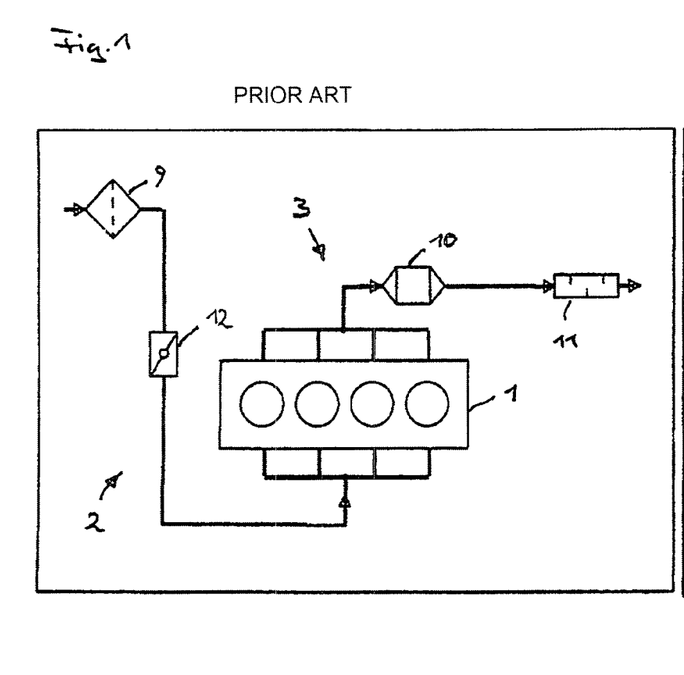
FIG. 1 is a schematic view of an internal-combustion engine with a load control by way of a throttle valve.

FIG. 1 schematically illustrates an internal-combustion engine with a load control by way of a throttle valve according to the state of the art. By way of an intake tract 2, the internal-combustion engine 1 with cylinders symbolically illustrated by four circles takes in combustion air first through an intake silencer 9 and subsequently past a throttle element 12, for example, a throttle valve or a roller barrel. This taken-in combustion air is subsequently burnt with fuel in the cylinders and discharged again through an exhaust system 3. In the flow direction of the exhaust gas, an emission control system 10 for purifying the exhaust gas and then a muffler 11 are arranged in the exhaust system 3.

This classical load control of a volume-controlled (λ=1) internal-combustion engine 1 takes place by use of the throttle valve 12 by "diluting" the intake air in the intake tract in front of the gas exchange inlet valves of the internal-combustion engine 1. As illustrated above, FIG. 1 shows a corresponding arrangement by the example of a four-cylinder reciprocating-piston internal-combustion engine 1.

Figure 2:
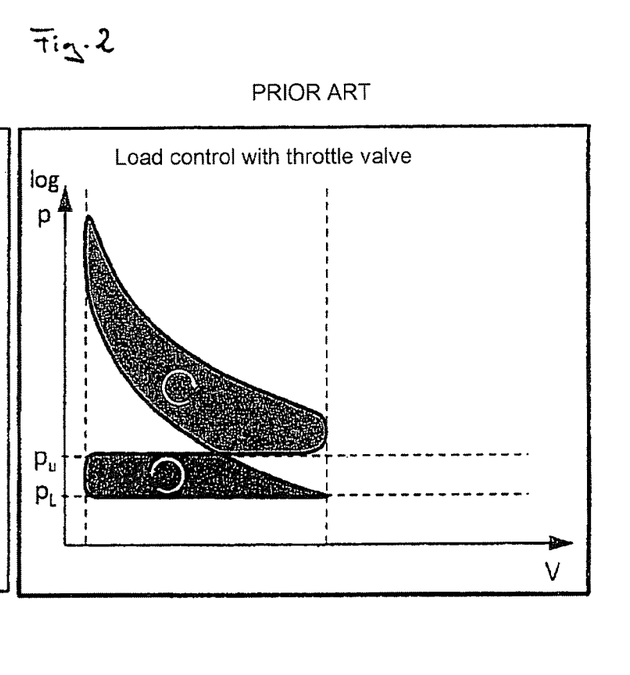
FIG. 2 is a graphical view of a process course pertaining to FIG. 1, in a first p-V diagram (pressure-volume over a load cycle)

FIG. 2 illustrates a process course pertaining to FIG. 1 in a first p-V diagram (pressure-volume over a load cycle) for a partial load of the internal-combustion engine 1. Since a p-V diagram for an internal-combustion engine 1 is familiar and known per se to the person skilled in the field of machine or engine construction, this will not be explained here to the last detail. For a better resolution of the low pressure range, a logarithmic scale is shown for the pressure.

In order to adjust a partial load of the internal-combustion engine, in the case of a volume-controlled load process, the volume of air is reduced that is fed to the internal-combustion engine 1. In the throttle process, the air is throttled for this purpose by the throttle element 12 to the pressure $p_L$, at which the density of the combustion air occurs that is necessary for the required load. Since the internal-combustion engine 1 takes in the combustion air at the low pressure $p_L$, but has to push out the exhaust gas against the ambient pressure $p_U$, the work in the charge cycle loop becomes negative and is lost in the work process. This charge cycle loop is the loop that rotates counterclockwise, illustrated by a circular arrow in the p-V diagram. This results in poor efficiencies for the throttle process in the partial load.

Figure 3:
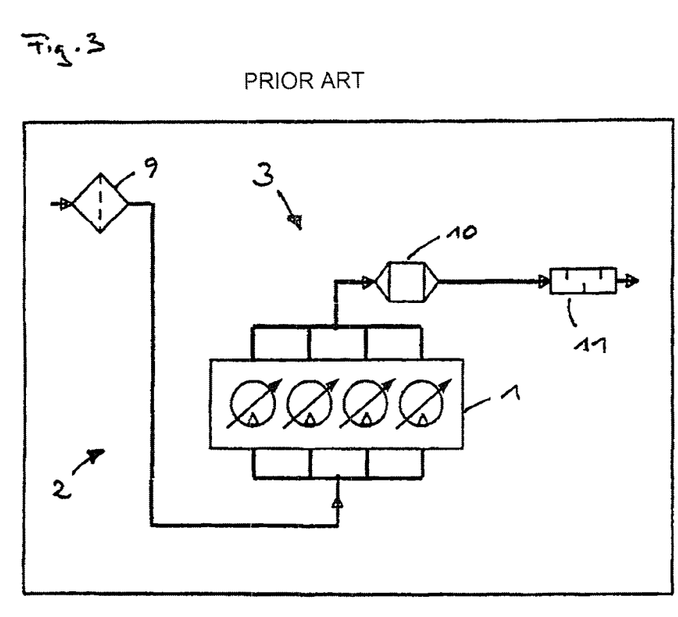
FIG. 3 is a schematic view of an internal-combustion engine with a load control by way of a variable valve drive (VVT)

FIG. 3 schematically illustrates an internal-combustion engine 1 with an unthrottled load control by way of a variable valve drive (VVT), also according to the state of the art. FIG. 3 differs from FIG. 1 in that the throttle element 12 is absent, but instead the load control takes place by means of a variable valve drive (VVT), such as "Valvetronic" by BMW. In this unthrottled process, the load control takes place by a lift duration and/or opening duration variation of the gas exchange inlet valves. This is in each case symbolically illustrated by an arrow (for the variability) and a triangle (for the gas exchange inlet valve) in the cylinders.

A known measure for avoiding charge cycle losses in the case of volume-controlled load methods is the use of the above-mentioned variable valve drive (VVT). In this case, the gas exchange inlet valves are opened only as long or wide as necessary until the required combustion air volume is in the cylinder. The throttle element 12 is absent in this case. The pertaining process course is illustrated in FIG. 4.

Figure 4:
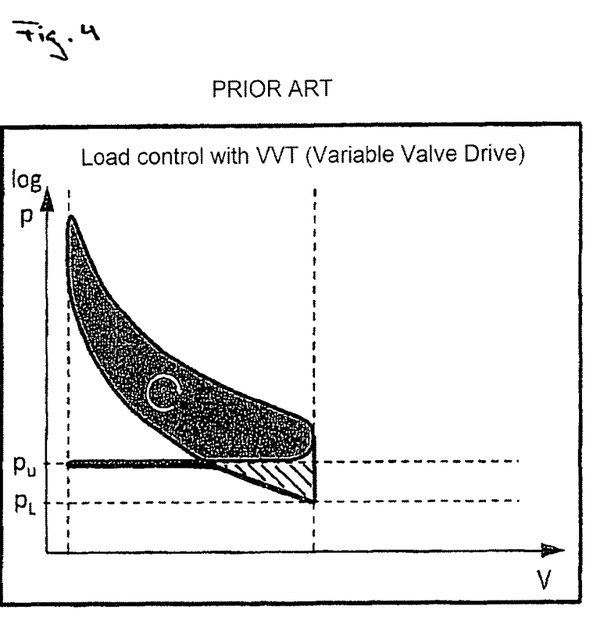
FIG. 4 is a graphical view of a process course pertaining to FIG. 3 in a second p-V diagram (VVT)

FIG. 4 illustrates the process course pertaining to FIG. 3 in a second p-V diagram (VVT). In this case, the necessary combustion air volume is taken in at ambient pressure $p_U$. The subsequent expansion in the cylinder to $p_L$ and the recompression to $p_U$ takes place almost without losses. The actual work process will then start. In this case, the counter-clockwise, loss-inducing process loop of FIG. 2 is largely avoided. The process course nevertheless deviates from the optimal Otto cycle because the hatched area below the ambient pressure $p_U$ cannot be tapped in the case of the VVT method. The maximal efficiency of the Otto cycle, as obtained at full load or in the case of a quality-controlled load control (for example, lean-burning method, $\lambda > 1$), can therefore not be achieved by use of this method at partial load.

Figure 5:
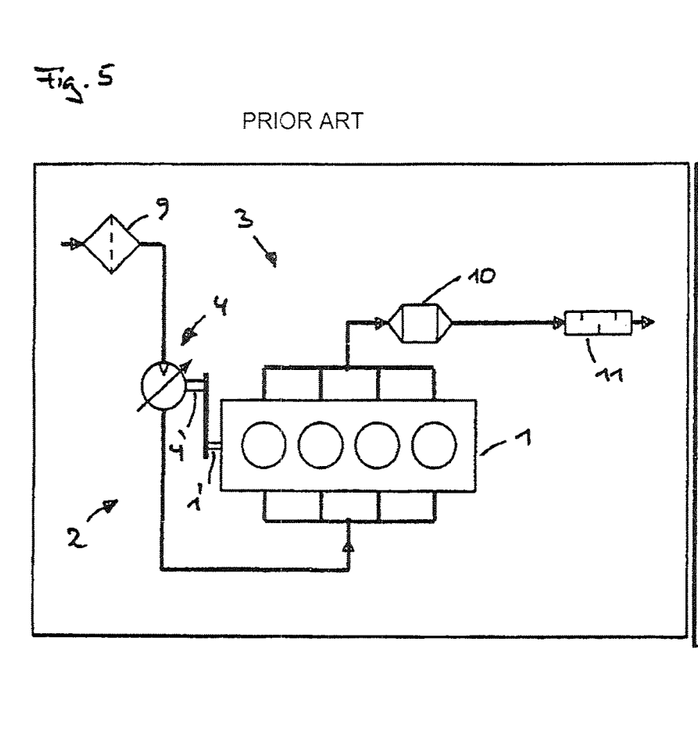
FIG. 5 is a schematic view of an internal-combustion engine with a load control by way of an expansion machine in the intake train (VLS, volumetric load control)

FIG. 5 schematically illustrates an internal-combustion engine 1 with an also known load control having an expansion machine 4 in the intake tract 2 (VLS, volumetric load control). Deviating from FIGS. 1 and 3, the internal-combustion engine 1 in FIG. 5 has neither a throttle element 12, nor a variable valve drive (VVT). In contrast, the expansion machine 4, whose output shaft 4' can be coupled with an output shaft 1' of the internal-combustion engine 1, for example, with a belt drive, is arranged in the intake tract 2.

An expansion machine is, for example, a compressor, a reciprocating engine, a turbine, a screw or also a vane.

This results in an alternative possibility for avoiding charge cycle losses by the use of the expansion machine 4. In this case, the combustion air is expanded to the pressure $p_L$, at which the density occurs that is necessary for the required load. By way of a mechanical coupling (for example, a belt drive), the expansion work is fed to the internal-combustion engine; as an alternative, an electric storage device could also be charged by way of a generator.

Figure 6:
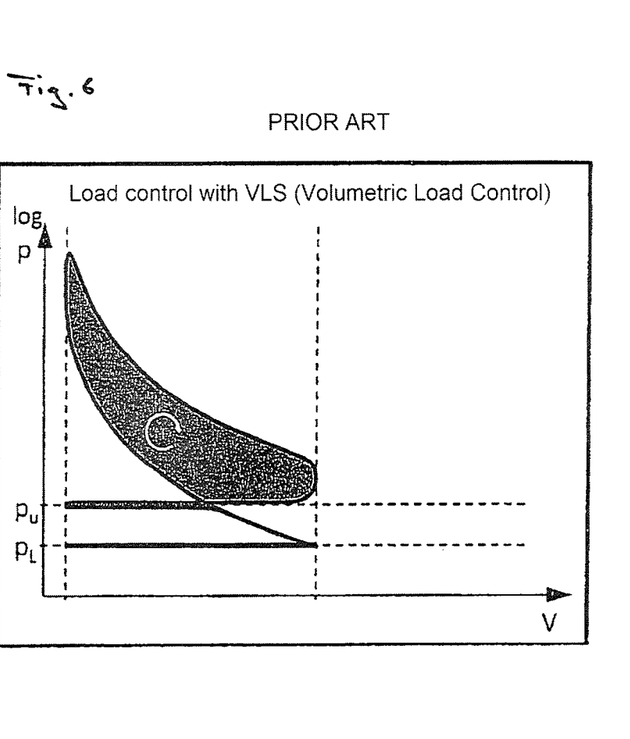
FIG. 6 is a graphical view of a process course pertaining to FIG. 5 in a third p-V diagram (VLS)

FIG. 6 illustrates a process course pertaining to FIG. 5 in a third p-V diagram (VLS, volumetric load control). The expansion machine 4 takes in the combustion air at ambient pressure $p_U$ and expands it to $p_L$. Subsequently, the pushing-out of the combustion air from the expansion machine 4 and the taking-in by the internal-combustion engine 1 will then take place in a work-neutral manner at the pressure level $p_L$. In this case, the compression work in the internal-combustion engine 1 from $p_L$ to $p_U$ is compensated by the expansion work in the expansion machine 4. The resulting process course corresponds to that of the load control with a variable valve drive VVT (compare FIG. 4).

This load control method can also be understood as a reversal of the function principle for the low-load range used during the charging technique with a compressor.

Figure 7:
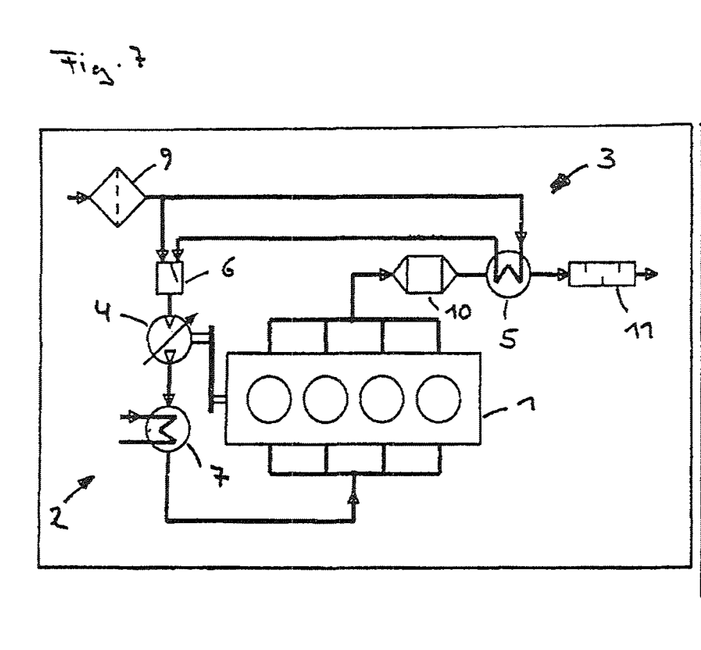
FIG. 7 is a schematic view of an internal-combustion engine with a load control (ELS, efficient load control) according to the invention.

FIG. 7 is a schematic view of an internal-combustion engine 1 with a load control method (ELS, efficient load control) according to an embodiment of the invention. FIG. 7 differs from FIG. 5 in that a heat exchanger 5, for example, a gas-gas heat exchanger, is provided in the exhaust system 3, by which the combustion air taken in by the internal-combustion engine 1 or the expansion machine 4 can be preheated. In order to adjust a defined temperature, a mixer 6 is provided in the intake tract 2 downstream from the heat exchanger 5 and upstream from the expansion machine 4, which mixer 6, for example, has a flap control or a roller control. An additional cooler 7, such as a charge air cooler, may be provided in the intake tract 2 between the expansion machine 4 and the internal-combustion engine 1, for cooling the preheated combustion air.

Figure 8:
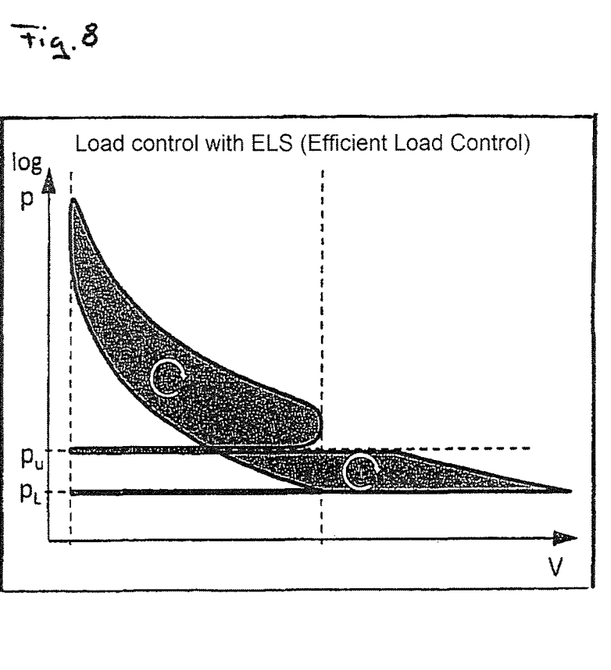
FIG. 8 is a graphical view of a process course pertaining to FIG. 7 in a fourth p-V diagram (ELS)

Accordingly, a further efficiency increase and an improvement of the fuel consumption can therefore be achieved in that the combustion air is heated by the heat exchanger 5 in the exhaust gas tract 3 and is then fed to the expansion machine 4 and, after the expansion to the pressure $p_L$, is cooled to a lower internal-combustion engine temperature level by way of the cooler 7, for example, by use of a charge air cooler. FIG. 8 illustrates the resulting process course.

FIG. 8 illustrates a process course pertaining to FIG. 7 in a fourth p-V diagram (ELS). The combustion air is fed to the expansion machine 4 at ambient-air pressure $p_U$. However, in comparison to FIG. 6, as a result of the combustion air temperature being raised by the heat exchanger 5, a clearly enlarged combustion air volume is obtained. In this case, the expansion work generated in the expansion machine 4 increases proportionally to the volume of the heated combustion air. After the expansion to the pressure level $p_L$ and the pushing-out of the expansion machine 4, the combustion air is cooled by the cooler 7 to approximately the ambient air temperature. For the internal-combustion engine 1, the further process course is then identical to that during the throttled operation (FIG. 2). In contrast to the throttle method (FIG. 2) or the VVT method (FIG. 4), in the work balance, a clockwise (right-rotating) process loop (arrow) remains below the ambient air pressure $p_U$, from which additional work can be obtained and thereby an improvement of the efficiency of the internal-combustion engine 1 can be achieved.

As described above, with a variable design of the expansion machine 4 as an expansion and compression machine, a charging can additionally be implemented. For the charging operation of the internal-combustion engine 1, by way of a change-over flap in the mixer 6 in front of the expansion machine 4, the air conduction by way of the heat exchanger 5 is closed and cold air is fed directly to the expansion machine 4. Generally, the flap in the mixer 6 (temperature regulator for the combustion air) in the heat exchanger operation, by mixing heated combustion air with cold combustion air, can adjust a desired temperature level in front of the expansion machine 4. As a result, the system can be very flexibly adjusted to operating conditions or operating limits (for example, limit temperatures, cooler sizes, expansion ratio, etc.). The principle of the load control with the expansion machine and the exhaust heat utilization is called ELS (efficient load control) here.

The method according to the invention is now characterized in that, before it flows through the expansion machine 4, the combustion air is heated in the heat exchanger 5 by the exhaust gas of the internal-combustion engine 1.

In a further development of the invention, the heated combustion air, before entering the expansion machine 4, is mixed in the mixer 6 with unheated combustion air. In another further development of the method, the combustion air is cooled downstream from the expansion machine 4 and in front of the inlet valve of the internal-combustion engine in the cooler 7.

Figure 9:
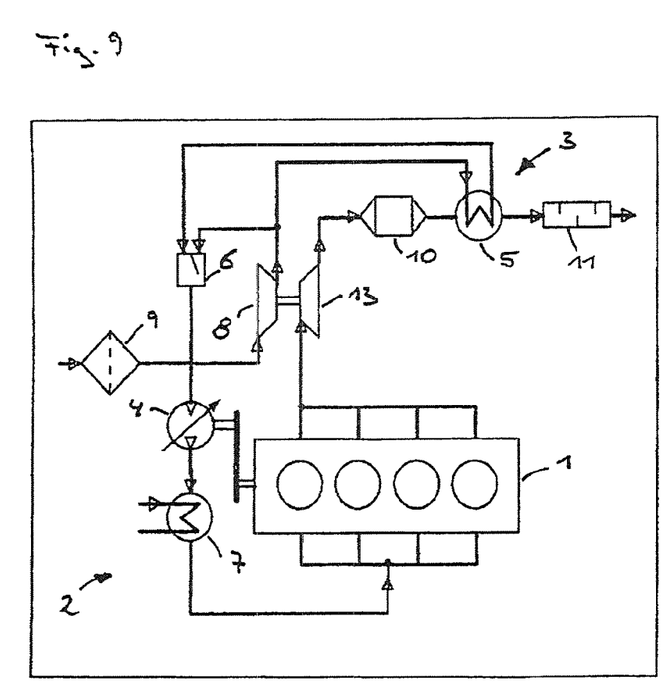
FIG. 9 is a schematic view of an internal-combustion engine with a load control (ELS) according to the invention with additional exhaust gas turbocharging.

FIG. 9 is a schematic view of an internal-combustion engine 1 with a load control (ELS) according to another embodiment of the invention which is a further development of the internal-combustion engine 1 of the invention according to FIG. 7.

In contrast to the internal-combustion engine 1 in FIG. 7, the internal-combustion engine 1 in FIG. 9 has an exhaust gas turbocharger with an exhaust gas turbine 13 in the exhaust system 3 and a compressor 8 in the intake tract 2. The exhaust gas turbine 13 of the exhaust gas turbocharger is arranged between the internal-combustion engine 1 and the emission control system 10; the compressor of the exhaust gas turbocharger (ATL) is arranged between the intake silencer 9 and the mixer 6 or the heat exchanger 5.

FIG. 9 illustrates that, in a further development of the invention, the efficient load control (ELS) can also be connected very well with an exhaust gas turbocharging system. In FIG. 9, the internal-combustion engine 4 is illustrated with an exhaust gas turbocharging system, supplemented by the expansion machine 4. The pertaining process course is shown in FIG. 10.

Figure 10:
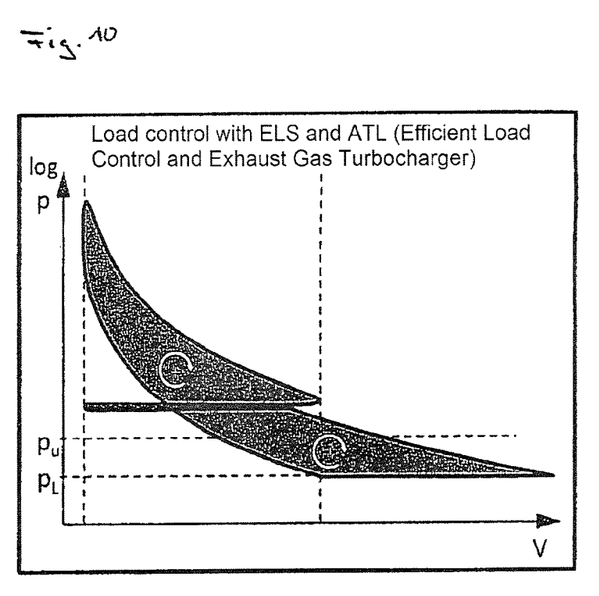
FIG. 10 is a graphical view of a process course pertaining to FIG. 9 in a fifth p-V diagram (ELS and ATL).

FIG. 10 illustrates a process course pertaining to FIG. 9 in a fifth p-V diagram (ELS and ATL). By means of the exhaust gas turbocharger (ATL), the combustion air can be supercharged in the higher partial load range and the pressure difference can thereby be increased by way of the expansion machine 4. As a result, the efficiency advantages of the expansion machine 4 can be expanded to a higher load range of the internal-combustion engine 1. By means of a not illustrated waste gate control (bypass of the turbine 13), a condition that is optimal for the respective operating point can be adjusted with respect to the pressure and the temperature in front of the expansion machine 4. When the waste gate is open, the highest temperature is obtained; when the waste gate is closed, the highest pressure is obtained. With the simultaneous utilization of the expansion machine 4 also as a compressor, a combination is created of the exhaust gas turbocharger and the compressor. It is known that, as a result, a significant improvement of the response behavior of the exhaust gas turbocharger (avoidance of a "turbo lag") can be achieved.

In this embodiment, the method according to the invention is further developed in that the combustion air is compressed in the flow direction of the combustion air in front of the heat exchanger 5 and/or the mixer 6 by use of the compressor 8. Furthermore, the expansion machine 4 can be operated as a second compressor.

The internal-combustion engine for the method according to the invention may naturally be a four-stroke or a two-stroke internal-combustion engine or also a rotary-piston internal-combustion engine. It is also contemplated to use the method according to the invention in an internal-combustion engine operating as a Diesel or Otto engine.

Summarizing, the method according to the invention (ELS) and the internal-combustion engine further developed according to the invention have the following advantages:

(a) Very favorable fuel consumption with a high power potential and a very good response behavior when exhaust gas turbocharging (ATL);

(b) no high-expenditure internal internal-combustion engine techniques (such as variable valve timing) or burning methods (such as lean-burning methods with a correspondingly high-expenditure exhaust gas after treatment, HCCI, etc.) are required;

(c) the system (method and device) according to the invention can be represented without changing the internal-combustion engine concept (for example, on a TGDI internal-combustion engine (turbo gasoline direct injection)) by way of exclusively external measures (change-over flap, exhaust gas—combustion air—heat exchanger, expansion machine, charge air cooler);

(d) the burning method according to the invention is a conventional λ=1 burning method without any high-expenditure exhaust gas after treatment, and worldwide use of the invention will therefore be possible; and (e) compared with the benefit, there are only minimal constructional expenditures and a very low technical risk.

LIST OF REFERENCE NUMBERS

1 Internal-combustion engine
1' Output shaft of the internal-combustion engine
2 Intake tract
3 Exhaust system
4 Expansion machine
4' Output shaft of the expansion machine
5 Heat exchanger
6 Mixer
7 Cooler
8 Compressor
9 Intake silencer
10 Emission control system
11 Muffler
12 Throttle element
13 Turbine The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a volume-controlled internal-combustion engine having an intake tract and an exhaust system, an expansion machine being arranged in the intake tract in a flow direction of combustion air upstream of an inlet valve of the internal-combustion engine, and an output shaft of the expansion machine being coupleable with an output shaft of the internal-combustion engine or a drive shaft of an electric machine, the method comprising the acts of:

providing a heat exchanger in the exhaust system;
heating the combustion air in the heat exchanger by an exhaust gas of the internal-combustion engine before flowing the combustion air through the expansion machine;
mixing, with unheated combustion air, the heated combustion air in a mixer before flowing the combustion air into the expansion machine;
cooling the combustion air downstream of the expansion machine and upstream of the inlet valve in a cooler;
compressing with a first compressor the combustion air upstream of the heat exchanger and upstream of the mixer; and
operating the expansion machine as a second compressor.

2. A volume-controlled internal-combustion engine, comprising:
an intake tract;
an exhaust system;
an expansion machine operatively arranged in the intake tract in a flow direction of combustion air upstream from an inlet valve of the internal-combustion engine;
an output shaft of the expansion machine operatively coupleable with an output shaft of the internal-combustion engine or with a drive shaft of an electric machine;
a heat exchanger operatively arranged in the exhaust system, wherein
exhaust gas of the internal-combustion engine is used in the heat exchanger to heat combustion air before said combustion air flows through the expansion machine,
a mixer operatively arranged in the intake tract in the flow direction of the combustion air downstream from the heat exchanger and upstream from the expansion machine, wherein
the mixer is configured to mix the heated combustion air with unheated combustion air a cooler operatively arranged in the intake tract between the expansion machine and the inlet valve, the cooler being configured to cool the combustion air, a compressor operatively arranged in the intake tract in the flow direction of the combustion air upstream of the heat exchanger and upstream of the mixer, wherein the expansion machine is operable as a second compressor.

* * * * *